(12) United States Patent
Nakamura et al.

(10) Patent No.: US 6,655,516 B2
(45) Date of Patent: Dec. 2, 2003

(54) CONCENTRICALLY ARRANGED PULLEY AND SHAFT WITH ONE-WAY CLUTCH

(75) Inventors: Shigenobu Nakamura, Anjo (JP); Akihiro Mizutani, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/988,148

(22) Filed: Nov. 19, 2001

(65) Prior Publication Data

US 2002/0060117 A1 May 23, 2002

(30) Foreign Application Priority Data

Nov. 22, 2000 (JP) .................................. 2000-356175
Jul. 13, 2001 (JP) .................................. 2001-214314

(51) Int. Cl.$^7$ .......................... F16D 41/06; F16H 55/36
(52) U.S. Cl. ...................................... 192/45; 192/110 B
(58) Field of Search ............................ 192/45, 41 R, 192/110 B

(56) References Cited

U.S. PATENT DOCUMENTS

| 3,885,544 | A | * | 5/1975 | Pfeiffer | .................. | 123/179.26 |
| 6,116,393 | A | * | 9/2000 | Ooitsu et al. | .................. | 192/45 |
| 6,129,189 | A | * | 10/2000 | Kerr | .......................... | 192/45 |
| 6,170,625 | B1 | * | 1/2001 | Tanaka | ........................ | 192/45 |
| 6,343,682 | B1 | * | 2/2002 | Terada et al. | .................. | 192/45 |
| 6,394,249 | B1 | * | 5/2002 | Tazumi et al. | ................. | 192/45 |

FOREIGN PATENT DOCUMENTS

| GB | 2 330 884 A | * | 5/1999 |
| JP | A 11-94054 | | 4/1999 |

OTHER PUBLICATIONS

"attachment", Webster Revised Unabridged Dictinary, 1996, 1998 MICRA Inc.*
"portion", Webster Revised Unabridged Dictionary, 1996, 1998 MICRA Inc.*
U.S. patent application Ser. No. 09/985,134, Murata et al., filed Nov. 1, 2001.

* cited by examiner

Primary Examiner—Saul Rodriguez
(74) Attorney, Agent, or Firm—Oliff & Berridge, PLC

(57) ABSTRACT

Providing a pulley unit with a reduced diameter, stable operating characteristics, and that is simple and readily removable from an engine is accomplished by a one-way clutch disposed between a pulley and a shaft body that are concentrically arranged. A shaft defines a shaft attachment space at a position which is not overlapped by rollers contained in the one-way clutch in an axial direction. The shaft body is attached to the shaft at the shaft attachment space. The shaft body, disposed inside the rollers in a radial direction, does not have a through hole, but rather, has a non-through structure.

17 Claims, 6 Drawing Sheets

CONCENTRICALLY ARRANGED PULLEY AND SHAFT WITH ONE-WAY CLUTCH

BACKGROUND OF THE INVENTION

1. Technical Field of the Invention

The present invention relates to a pulley unit including a one-way clutch.

2. Description of Related Art

Various accessories mounted on a vehicle engine are attached to a belt driven by an engine's crankshaft. However, when an accessory such as an alternator is connected to the crankshaft of the engine, and rotated synchronistically with the crankshaft, the following problem occurs. That is, when a rotational speed of the crankshaft is reduced, alternator power generation is also reduced. Conventionally, to avoid such a problem, a pulley unit containing a one-way clutch is used for a vehicle alternator so as to improve power generation efficiency when the rotational speed of the crankshaft is reduced.

FIG. 8 is a related art, cross-sectional view showing a conventional pulley unit containing a one-way clutch. As shown in FIG. 8, the conventional pulley unit includes a pulley 200, a shaft body 210 and a one-way clutch 220. The pulley 200 and the shaft body 210 are concentrically disposed, and the one-way clutch 220 is disposed in a space therebetween at a middle position in an axial direction. The one-way clutch 220 is composed of an outer ring 222 fixed to the pulley 200, an inner ring 224 fixed to the shaft body 210, and plural cylindrical rollers 226 sandwiched between the outer ring 222 and the inner ring 224. The outer ring 222 and the inner ring 224 define a plurality of wedge-shaped spaces therebetween in a circumferential direction. The rollers 226 are disposed in these wedge-shaped spaces, thereby constructing the one-way clutch 220 for transmitting rotational driving force only in a single direction.

The one-way clutch 220 is switched using this type pulley unit between a locked condition (driving-force transmitting condition) and a free condition (driving-force interrupting condition) in accordance with a revolution speed difference between a rotor of the vehicle alternator, integrated to the shaft body 210, and the pulley 200. Thus, a driving force can be transmitted and interrupted between the rotor and the pulley 200. Two bearings 230 are provided at both ends of the one-way clutch 220 in its axial direction, respectively, so as to smooth any relative rotational operation between the rotor and the pulley 200 and to undertake a load added from the belt.

In the above conventional pulley unit, the shaft body 210, provided inside the one-way clutch 220 in its radial direction, defines an attachment through hole at its center. The pulley unit is attached to a shaft of an accessory using this attachment through hole. Therefore, when water hits an end surface of the pulley unit used in a state where the pulley unit is attached to the crankshaft, the water enters between the shaft body 210 and the shaft. Then, portions covered with the water rust, and it is difficult to remove the pulley unit from the shaft. Water, hitting the end surface of the pulley unit, is generally prevented from entering the pulley unit by a cap covering the end surface of the pulley unit. However, because of this arrangement, the number of components must be increased making an attachment process complicated, thereby increasing production costs.

It has been considered that a diameter of a pulley unit be reduced to increase a rotational speed of the accessory. The conventional pulley unit shown in FIG. 8 defines the attachment through hole at its center, and the one-way clutch 220 is provided outside the attachment through hole. Therefore, the conventional pulley unit has a complicated structure in its radial direction, and the diameter of the pulley unit is difficult to reduce.

There are screw portions, each provided on the shaft and a surface defining the attachment through hole, inside the one-way clutch 220 in its radial direction. When the pulley unit is attached to the shaft, the screw portions are clamped to each other so that the shaft body 210 is deformed outside in its radial direction by a clamping force in its axial direction by force received from the screw portions. Therefore, the shape of the plural wedge-shaped spaces, provided in the one-way clutch 220 in its circumferential direction, where the plurality of rollers 226 are contained, changes. As a result, the one-way clutch 220 sometimes does not operate in a normal, stable fashion.

FIG. 3 is a related art, cross-sectional view that exemplifies a case where the cam surface 224a is deformed in the radial direction in a conventional pulley unit. As shown, the wedge angle of the wedge-shaped space, formed between the outer ring 222 and the inner ring 224, controls the position of roller 226 and changes the wedge-shaped space from a wedge angle $\theta_1$, at which the cam surface is not deformed, to a wedge angle $\theta_2$, at which the cam surface is deformed. Therefore, the rotational speed at which either the lock or free state switches, varies in accordance with the degree of deformation, thereby degrading operational stability.

SUMMARY OF THE INVENTION

The present invention has been made in view of the above problems, and an object is to provide a pulley unit with a diameter that can be reduced, whose operation can be stabilized, and that is readily removable after being used, without increasing current production costs.

In order to solve the above problems, a pulley unit of the present invention includes a one-way clutch disposed between a pulley and a shaft body which are arranged concentrically. In the pulley unit, further, the one-way clutch includes a roller contained in a wedge-shaped space. The shaft body includes a shaft attachment portion, by which the shaft body is integrated to the shaft, at a position which is not overlapped with the roller in an axial direction. Since the shaft attachment portion is not provided inside the roller in a radial direction, a radial cross-sectional structure of the pulley unit can be simplified at this portion, and a diameter thereof can be reduced.

Preferably, the shaft attachment portion is a female screw portion clamped to a male screw portion provided on an outer surface of the shaft. Generally, the pulley unit is required to be clamped or fixed to the male screw portion of the shaft by a large force so as to prevent falling and circular movement of the pulley unit. In the pulley unit, since the female screw portion is not formed inside the roller in a radial direction, a wedge-shaped space around the roller is not deformed by a clamping force generated in an axial direction at a clamping time by force received from the male screw portion of the shaft, thereby stabilizing operation of the one-way clutch.

The above shaft attachment portion, having a recessed shape, is provided on an end surface of the shaft body, and preferably, the shaft body is formed in a non-through structure, that is, the shaft body defines a non-through hole. Therefore, when water strikes the end surface of the pulley unit, it is prevented from entering the clamped portion between the shaft and the shaft body, thereby preventing rust from forming. Accordingly, the pulley unit can be readily removed from the vehicle after being used without increasing production cost, and using a cap and the like.

Preferably, the above shaft body includes a projection-shaped screwing portion, by which the shaft body is clamped to the shaft, on an end surface at an opposite side of the shaft attachment portion. Since the screwing portion is not required to be provided inside the shaft body, a diameter of the shaft body can be reduced by a diameter of the screwing portion, thereby further reducing a diameter of the pulley unit.

Preferably, the above shaft body is formed by fixing, to each other, a member where the one-way clutch is formed facing the roller, and a separate member having the shaft attachment portion. When the shaft attachment portion is a separate member, heat treatment for improving abrasion resistance is permitted only for the member where the one-way clutch is formed. Therefore, production equipment costs can be reduced while heat treatment time is shortened, thereby reducing production costs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

Hereinafter, detail description will be made on a pulley unit according to an embodiment of the present invention with reference to the drawings.

Figure 1:
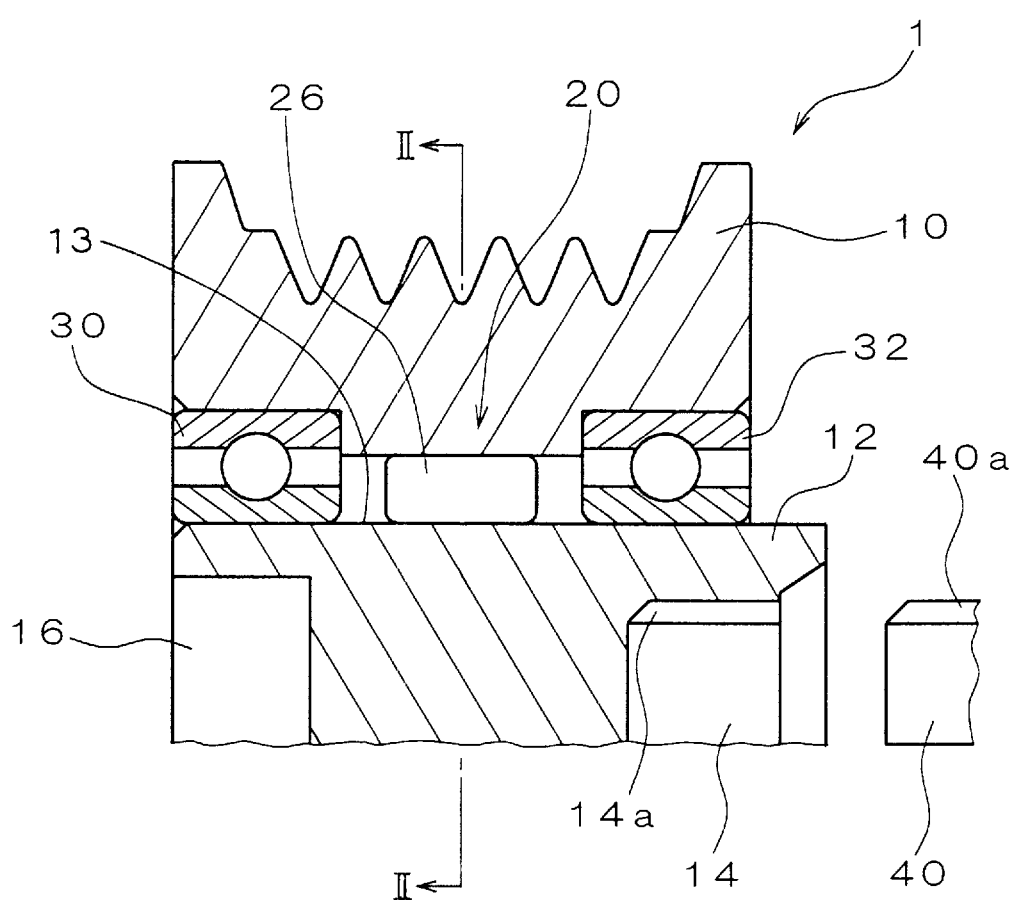
FIG. 1 is an axial cross-cross-sectional view showing a pulley unit according to an embodiment of the present invention.
Figure 2:
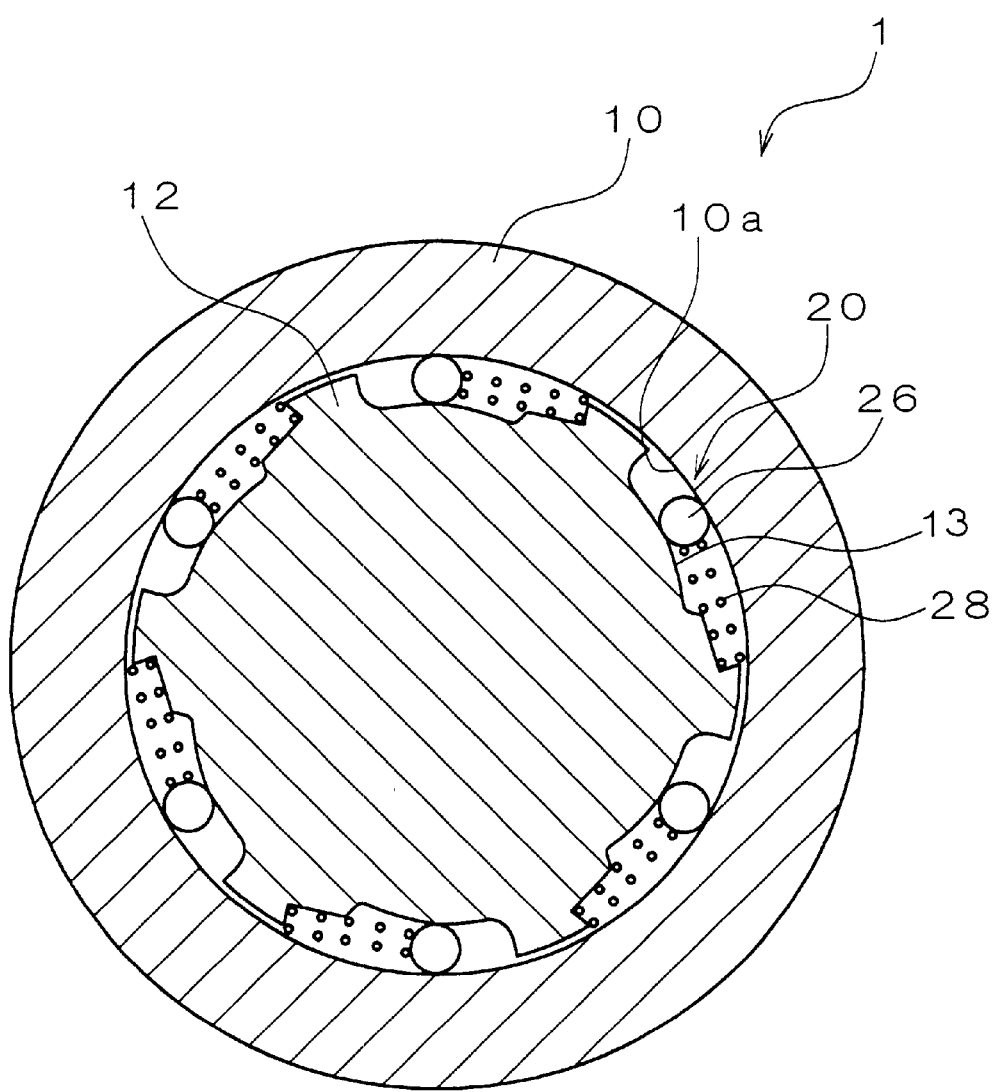
FIG. 2 is a cross-sectional view taken along line II—II in FIG. 1.

FIG. 1 is an axial cross-sectional view showing a pulley unit 1 according to the embodiment, and FIG. 2 is a cross-sectional view taken along line II—II in FIG. 1.

As shown in FIGS. 1 and 2, the pulley unit 1 according to the present embodiment includes a pulley 10, a shaft body 12, a one-way clutch 20 and two bearings 30, 32. The pulley 10 and the shaft body 12 are concentrically disposed, the one-way clutch 20 is disposed in an annular space therebetween, and the two bearings 30, 32 are disposed in the one-way clutch 20 at both sides in its axial direction.

The pulley 10 includes a wave-shaped groove on its periphery, and a belt is wrapped around the wave-shaped groove. The pulley 10 is rotated by a crankshaft of a vehicle engine by using the belt. The shaft body 12 is a cylindrical member, and it is fixed to a shaft of a vehicle accessory (e.g., a shaft of a vehicle alternator) 40.

The shaft body 12 includes plural cam surfaces 13 each having a curved shape at its outside portion in its circumferential direction. The plural cam surfaces 13 and an inner surface 10a of the pulley 10 define plural pocket spaces, and a roller 26 and a coil spring 28 are contained in each pocket space. The coil spring 28 has a substantially rectangular cross-section, and it presses the roller 26 in a circumferential direction and in a single direction.

A clutch cam portion including a wedge-shaped space, of which width in a radial direction is gradually reduced in the circumferential direction, is provided in the pocket space. The roller 26 is pressed to a narrower side (lock side) of the wedge-shaped space by the coil spring 28. The one-way clutch 20 is composed of the pocket spaces, the rollers 26 and the coil springs 28.

The shaft body 12 defines a shaft attachment space 14, at which the shaft body 12 is attached to the shaft 40, at a position which is not overlapped with the rollers 26 in its axial direction. Specifically, the shaft body 12 defines the shaft attachment space 14 at one end in a recess shape, and a female screw portion 14a is formed on an inner surface defining the shaft attachment space 14. The female screw portion 14a is screwed to a male screw portion 40a formed on an outer surface of the shaft 40 around its tip, so that the pulley unit 1 is attached to the shaft 40. A screwing tool is inserted into a screwing space 16 which is defined on the shaft body 12 at the other end thereof, and it is screwed at a predetermined screw torque, so that screwing work is performed.

The pulley unit 1 according to the present embodiment has such structure. Next, operational situations will be described.

(1) When a revolution speed of the pulley 10 is higher than that of the shaft body 12:

Each roller 26 of the one-way clutch 20 moves to the radially narrower side or portion of each wedge-shaped space. Therefore, each roller 26 is sandwiched between each cam surface 13 and the inner surface 10a of the pulley 10, so that the shaft body 12a and the pulley 10 become locked when they are integrally rotated. Accordingly, they become integral with each other, and synchronistically rotate.

(2) When the revolution speed of the pulley 10 is lower than that of the shaft body 12, or when the pulley 10 is rotated in an inverse direction from a rotational direction of the shaft body 12:

Each roller 26 of the one-way clutch 20 moves to the radially wider side or portion of each wedge-shaped space. Therefore, each roller 26 is released from the state where it is sandwiched between each cam surface 13 and the inner surface 10a, so that the shaft body 12 and the pulley 10 come into a free state in which they can be individually rotated. Accordingly, transmittance of rotational driving force from the pulley 10 to the shaft body 12 is interrupted, so that the shaft body 12 maintains its rotational speed by a rotational inertia force of the rotor.

In consideration of a case where the above pulley unit 1 is used for a vehicle alternator, the power generation efficiency can be improved by maintaining a high revolution speed of the rotor irrespective of revolution speed fluctuation of an engine crankshaft connected to the pulley unit 1 through the belt. That is, when the revolution speed of the crankshaft is increased, the one-way clutch 20 comes into the lock state, so that the shaft body 12 and the pulley are synchronistically rotated. Then, when the rotational speed of the crankshaft is decreased, the one-way clutch 20 transitions to the free state, so that the shaft body 12 maintains its rotational speed by the rotational inertial force irrespective of the decreased rotational speed of the pulley 10.

In such a case where the pulley unit 1 is clamped and fixed to the shaft 40, the clamping force is required to be increased so that an axial force of one ton or more is applied to the female screw portion 14a so as to prevent falling and circular movement of the pulley unit 1. Therefore, the shaft body 12 is deformed on an outer periphery in its radial direction by this axial force. In the pulley unit 1 according to the present embodiment, however, the female screw portion 14a of the shaft body 12 is formed at the position which is not overlapped with the rollers 26 of the one-way clutch 20 in the axial direction of the shaft body 12. That is, there is not the female screw portion 14a inside the cam surfaces 13, which is an inside contact surface for the rollers 26, in the radial direction of the shaft body 12. Therefore, since the cam surfaces 13 are not affected by this deformation around the female screw portion 14a, a wedge angle of each wedge-shaped space is maintained at a predetermined angle. Thus, action of each roller 26 of the one-way clutch 20 is stabilized in both, the lock and free states, and a revolution speed at which these two states is switched is stabilized, thereby ensuring functional stabilization of the one-way clutch 20.

Figure 3:
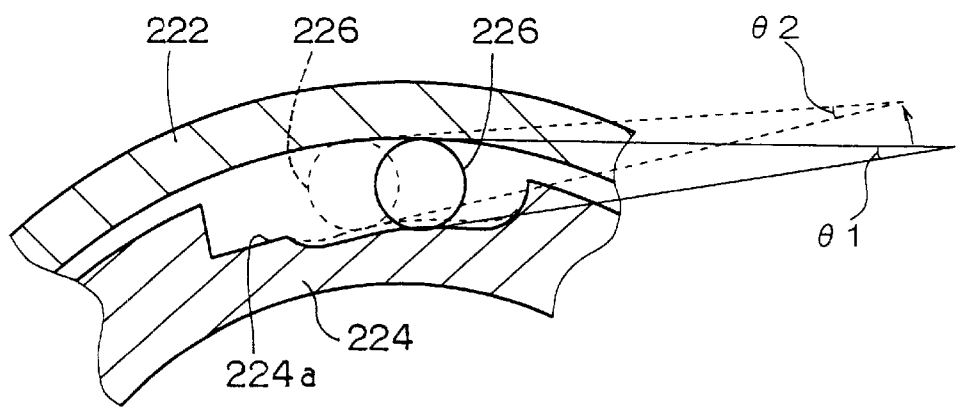
FIG. 3 is a related art explanation view showing a change of a wedge angle when an inner member (shaft body) is deformed.
Figure 8:
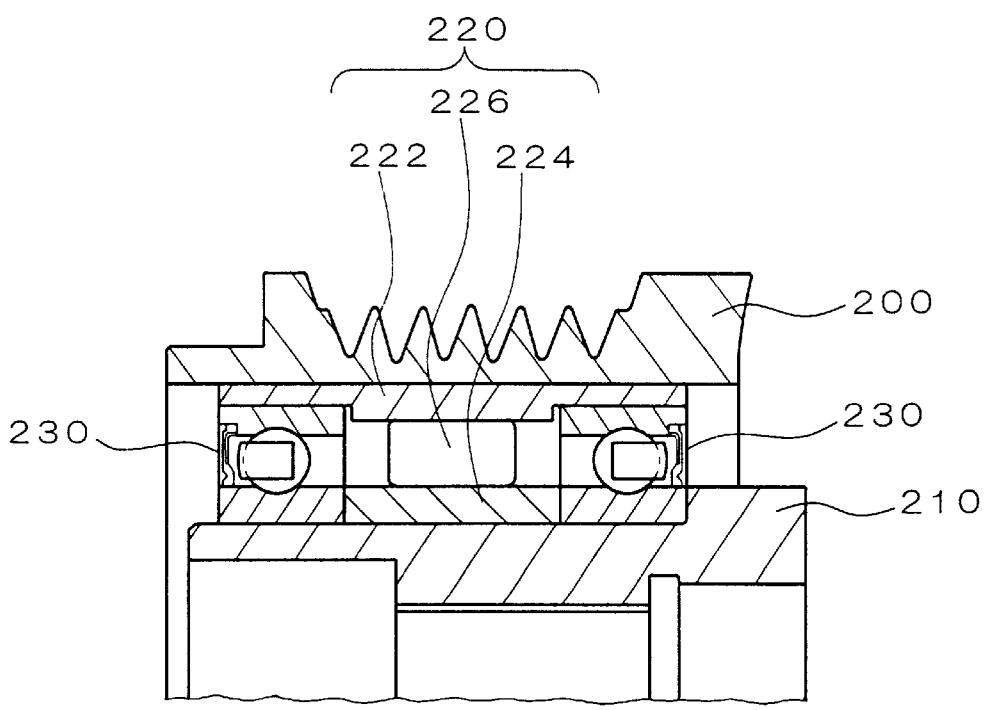
FIG. 8 is a related art, axial cross-sectional view showing a conventional pulley unit with a one-way clutch.

In a case where the cam surface is deformed in the radial direction in such a conventional pulley unit, as shown in the related art of FIG. 3, the wedge angle of the wedge-shaped space changes from a wedge angle θ1, at which the cam surface is not deformed, to a wedge angle θ2 at which the cam surface is deformed. To elaborate, FIG. 3 exemplifies a case where the cam surface 224a is deformed in the radial direction. As shown, the wedge angle of the wedge-shaped space, formed between the outer ring 222 and the inner ring 224, controls the position of roller 226 and changes the wedge-shaped space from a wedge angle θ1, at which the cam surface is not deformed, to a wedge angle θ2, at which the cam surface is deformed. Therefore, the rotational speed at which either the lock or free state switches, varies in accordance with the degree of deformation, thereby degrading operational stability.

The shaft body 12 of the pulley unit 1 according to the present embodiment defines two non-through holes (shaft attachment space 14 and screwing space 16), that is, it has a non-through structure. Even when water strikes the end surface of the shaft body 12 where the screwing space 16 is provided, water does not enter between the shaft 40 and the female screw portion 14a, thereby preventing rust generation therebetween. Thus, after an installed vehicular accessory is used, the pulley unit 1 can be readily removed from the vehicle for maintenance or the like. Additionally, a cap or similar cover, for covering the end surface of the shaft body 12 to prevent rust generation on the female screw portion 14a, is not required. Therefore, the number of components is not increased, and attachment processes are not complicated, thereby preventing production costs from increasing. Additionally, since the shaft attachment space 14 is not provided inside of the rollers 26 of the one-way clutch 20 in its radial direction, the radial cross-sectional structure can be simplified at this portion, thereby reducing a diameter of the pulley unit 1.

The present invention can be modified in several ways without limiting the invention to the above embodiment. In the above embodiment, the rollers 26 are contained in the pocket spaces defined by an outer surface of the shaft body 12 shown as the cam surfaces 13. However, the pocket spaces can be defined by an inner surface of the pulley 10 as the cam surfaces.

Figure 4:
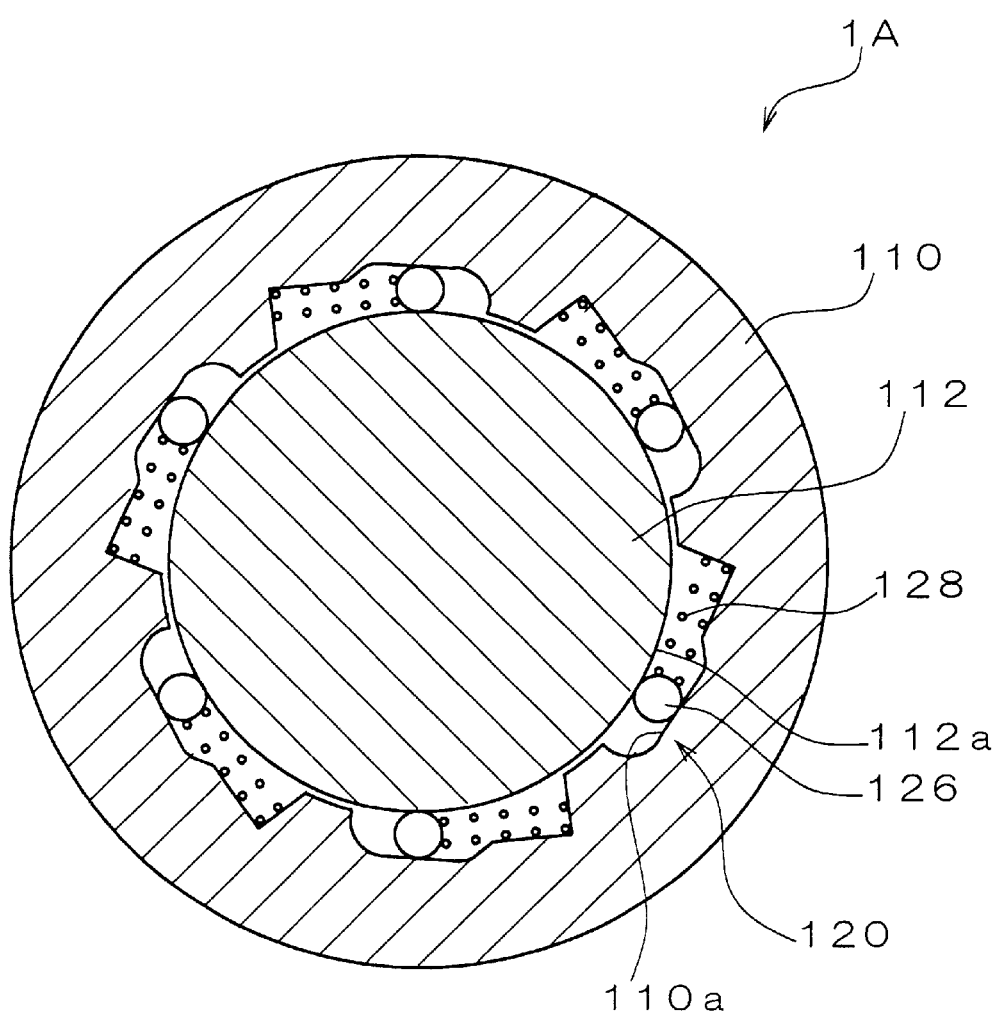
FIG. 4 is a cross-sectional view showing a pulley unit containing rollers in pocket spaces defined by an inner surface of a pulley.

FIG. 4 is a cross-sectional view showing a pulley unit 1A containing rollers 126 in pocket spaces defined by an inner surface of a pulley 110 as cam surfaces 110a. As shown in FIG. 4, the pulley unit 1A includes the pulley 110, a shaft body 112, a one-way clutch 120 and two bearings (not shown). The pulley 110 and the shaft body 112 are concentrically disposed, the one-way clutch 120 is disposed in an annular space therebetween, and the two bearings are disposed in the one-way clutch 120 at both end sides in its axial direction.

The pulley 110 includes plural cam surfaces 110a each having a curved shape at its inside in its circumferential direction. The plural cam surfaces 110a and an outer surface 112a of the shaft body 112 define plural pocket spaces, and a roller 126 and a coil spring 128 are contained in each pocket space. The coil spring 128 has a substantially rectangular cross-section, and it presses the roller 126 in a single, circumferential direction. The pocket space forms a clutch cam portion including a wedge-shaped space of which width in a radial direction is gradually reduced in the circumferential direction. The roller 126 is pressed to a narrower side (the locking side) of the wedge-shaped space by the coil spring 128. The one-way clutch 120 is composed of the pocket spaces, the rollers 126 and the coil springs 128. Although the screwing space 16, having a recess shape, is provided in one end surface of the shaft body 12 in the above embodiment, a screwing portion having a projection shape can be provided in place of the screwing space 16.

Figure 5:
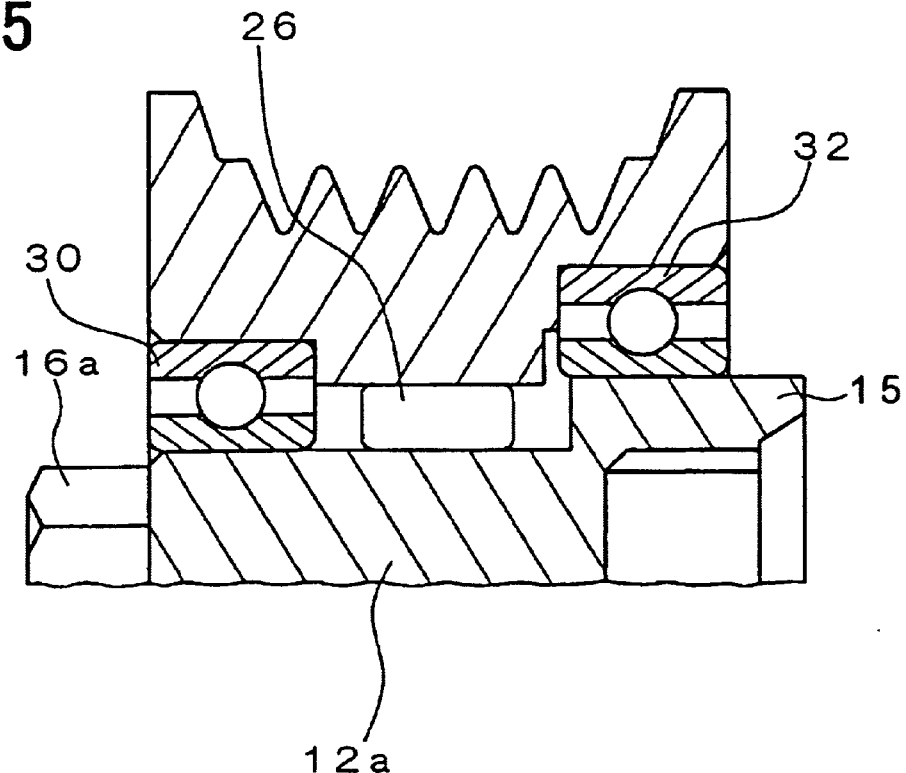
FIG. 5 is an axial cross-sectional view showing a pulley unit including a projection-shaped screwing portion.

FIG. 5 is an axial cross-sectional view showing a pulley unit including a projection-shaped screwing portion 16a. The shaft body 12a includes a projection-shaped screwing portion 16a on its end surface, and an outer diameter of the shaft body 12a is partially reduced at a portion adjacent to the rollers 26 and the bearing 30 at the tip side (side of the screwing portion 16a), thereby reducing a diameter of the entire pulley unit 1. The shaft body 12a also includes a raised hub 15.

Figure 6:
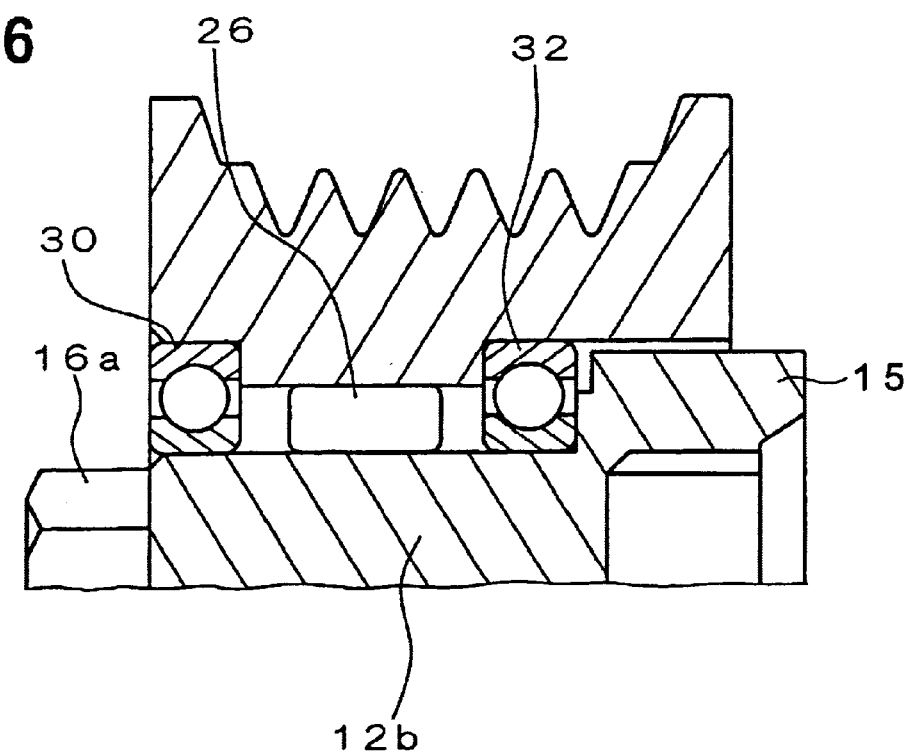
FIG. 6 is an axial cross-sectional view showing another pulley unit including a projection-shaped screwing portion.

FIG. 6 is an axial cross-sectional view showing another pulley unit including a projection-shaped screwing portion 16a. The structure shown in FIG. 6 is identical to the structure shown in FIG. 5 in a viewpoint where the projection-shaped screwing portion 16a is formed on the end surface of the shaft body 12b. The structure in FIG. 6 is different from the structure in FIG. 5 in a viewpoint where the outer diameter of the shaft body 12b is partially reduced at a portion adjacent to the rollers 26 and both bearings 30, 32, thereby reducing a diameter of the entire pulley unit 1. Although the pulley unit according to the present invention is applied to a vehicle alternator as an example in the above embodiment, it can be applied to an accessory other than the vehicle alternator, such as a compressor, a water pump and a cooling fan for an air conditioner. The shaft body 12b also includes a raised hub 15.

Figure 7:
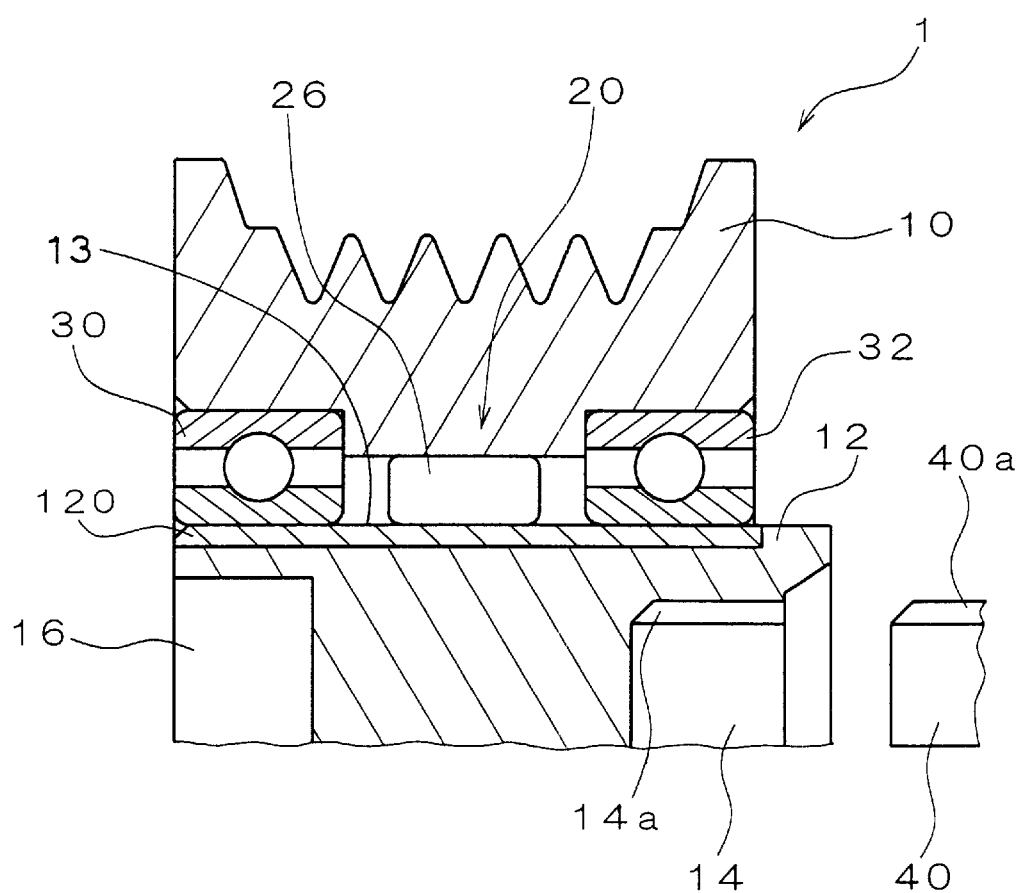
FIG. 7 is an axial cross-sectional view showing another pulley unit where a shaft attachment space and cam surfaces are provided separately from each other.

Although the shaft body 12, the shaft attachment space 14 and the cam surfaces 13 are integrally provided in the above embodiment, they can be provided separately from each other as shown in FIG. 7, and they can be integrally fixed to each other by press-fitting and the like. In this case, heat treatment for improving abrasion resistance is allowed to be performed only for a member 120 having cam surfaces constituting a one-way clutch. Therefore, heat capacity becomes small, and heat treatment time is lessened, thereby reducing a heat treating apparatus required for heat treatment and ultimately reducing production costs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pulley unit, comprising:
    a one-way clutch disposed between a pulley and a shaft body, the pulley and the shaft body being concentrically arranged thereby forming a space containing a roller, the shaft body further defining a shaft attachment portion; and
    a shaft for integration with the shaft attachment portion, the shaft attachment portion not overlapping with a roller of the one-way clutch in a shaft axial direction,
    wherein the shaft attachment portion defines a recession, and the shaft body is formed as a non-through structure.

2. The pulley unit according to claim 1,
    wherein the shaft body includes a projection-shaped screwing portion, by which the shaft body is attached to the shaft, at an end surface opposite to the shaft attachment portion.

3. A pulley unit, comprising:
    a one-way clutch disposed between a pulley and a shaft body, the pulley and the shaft body being concentrically arranged thereby forming a space containing a roller, the shaft body further defining a shaft attachment portion; and
    a shaft for integration with the shaft attachment portion, the shaft attachment portion not overlapping with a roller of the one-way clutch in a shaft axial direction,
    wherein the shaft body includes a projection-shaped screwing portion, by which the shaft body is attached to the shaft, at an end surface opposite to the shaft attachment portion, and
    the shaft body is formed by separately fixing a member, where the one-way clutch is formed, and also having a cam surface thereon for the rollers.

4. A shaft and pulley apparatus, comprising:
    a pulley;
    a shaft body, the shaft body located concentrically within the pulley and forming a shaft attachment portion;
    a female screw portion, the female screw portion formed inside the shaft attachment portion;
    a shaft, the shaft designed to fit within the shaft attachment portion, the shaft being concentrically aligned with the pulley and the shaft body;
    a male screw portion, the male screw portion located on the shaft and designed to interface with the female screw portion of the shaft attachment portion;
    a one-way clutch, the one-way clutch disposed between the pulley and the shaft body, the pulley and the shaft body being separated by a plurality of rollers located substantially centrally with regard to a width of the pulley and a width of the shaft body along an axial direction of the pulley and shaft body; and
    a first bearing and a second bearing, wherein the bearings are located at axially distal portions of the pulley on each side of the rollers, the second bearing being larger in diameter than the first bearing, the second bearing riding on a raised hub of the shaft body,
    wherein the shaft attachment portion does not overlap with the roller of the one-way clutch in a shaft axial direction.

5. A shaft and pulley apparatus, comprising:
    a pulley;
    a shaft body, the shaft body located concentrically within the pulley and forming a shaft attachment portion;
    a female screw portion, the female screw portion formed inside the shaft attachment portion;
    a shaft, the shaft designed to fit within the shaft attachment portion, the shaft being concentrically aligned with the pulley and the shaft body;
    a male screw portion, the male screw portion located on the shaft and designed to interface with the female screw portion of the shaft attachment portion;
    a one-way clutch, the one-way clutch disposed between the pulley and the shaft body, the pulley and the shaft body being separated by a plurality of rollers located substantially centrally with regard to a width of the pulley and a width of the shaft body along an axial direction of the pulley and shaft body;
    a projection-shaped screwing portion, the projection-shaped screwing portion permitting the shaft body to be fixed to the shaft, the projection-shaped screwing portion located at an end surface opposite to the shaft attachment portion; and
    a first bearing and a second bearing, wherein the bearings are located at substantially axially distal portions of the pulley on either side of the rollers, the second bearing being of equal diameter to the first bearing, the second bearing riding on the shaft body, as the first bearing, although the second bearing being located inside of a raised hub of the shaft body,
    wherein the shaft attachment portion does not overlap with the rollers of the one-way clutch in a shaft axial direction.

6. The shaft and pulley arrangement of claim 5, further comprising,
    a member, the member assisting to form the shaft body where the one-way clutch is formed, the member having a cam surface thereon for the rollers to contact.

7. The shaft and pulley arrangement of claim 6,
    wherein the projection-shaped screwing portion and the shaft attachment portion are axially aligned with respect to a shaft body.

8. A pulley unit, comprising:
    a one-way clutch disposed between a pulley and a shaft body, the pulley and the shaft body being concentrically arranged thereby forming a space containing a roller, the shaft body further defining a shaft attachment portion; and
    a shaft for integration with the shaft attachment portion, the shaft attachment portion not overlapping with a roller of the one-way clutch in a shaft axial direction, wherein the shaft body is formed by separately fixing a member, where the one-way clutch is formed, and also having a cam surface thereon for the rollers, and the shaft includes a projection-shaped screwing portion, by which the shaft body is attached to the shaft, at an end surface opposite to the shaft attachment portion.

9. A shaft and pulley apparatus, comprising:
    a pulley;

a shaft body, the shaft body located concentrically within the pulley and forming a shaft attachment portion;

a female screw portion, the female screw portion formed inside the shaft attachment portion;

a shaft, the shaft designed to fit within the shaft attachment portion, the shaft being concentrically aligned with the pulley and the shaft body;

a male screw portion, the male screw portion located on the shaft and designed to interface with the female screw portion of the shaft attachment portion;

a one-way clutch, the one-way clutch disposed between the pulley and the shaft body, the pulley and the shaft body being separated by a plurality of rollers located substantially centrally with regard to a width of the pulley and a width of the shaft body along an axial direction of the pulley and shaft body;

a projection-shaped screwing portion, the projection-shaped screwing portion permitting the shaft body to be fixed to the shaft, the projection-shaped screwing portion located at an end surface opposite to the shaft attachment portion; and a first bearing and a second bearing, wherein the bearings are located at axially distal portions of the pulley on each side of the rollers, the second bearing being larger in diameter than the first bearing, the second bearing riding on a raised hub of the shaft body and the shaft attachment portion does not overlap with the roller of the one-way clutch in a shaft axial direction.

10. A shaft and pulley apparatus, comprising:

a pulley;

a shaft body, the shaft body located concentrically within the pulley and forming a shaft attachment portion;

a female screw portion, the female screw portion formed inside the shaft attachment portion;

a shaft, the shaft designed to fit within the shaft attachment portion, the shaft being concentrically aligned with the pulley and the shaft body;

a male screw portion, the male screw portion located on the shaft and designed to interface with the female screw portion of the shaft attachment portion;

a one-way clutch, the one-way clutch disposed between the pulley and the shaft body, the pulley and the shaft body being separated by a plurality of rollers located substantially centrally with regard to a width of the pulley and a width of the shaft body along an axial direction of the pulley and shaft body;

a projection-shaped screwing portion, the projection-shaped screwing portion permitting the shaft body to be fixed to the shaft, the projection-shaped screwing portion located at an end surface opposite to the shaft attachment portion; and a first bearing and a second bearing, wherein the bearings are located at substantially axially distal portions of the pulley on either side of the rollers, the second bearing being of equal diameter to the first bearing, the second bearing riding on the shaft body, as the first bearing, although the second bearing being located inside of a raised hub of the shaft body, and the shaft attachment portion does not overlap with the roller of the one-way clutch in a shaft axial direction.

11. A shaft and pulley apparatus according to claim 10, further comprising a member, the member assisting to form the shaft body where the one-way clutch is formed, the member having a cam surface thereon for the rollers to contact.

12. A shaft and pulley apparatus according to claim 11, wherein the projection-shaped screwing portion and the shaft attachment portion are axially aligned with respect to a shaft body.

13. A pulley unit, comprising;

a pulley having a circumferential surface that is to be engaged with a power transmission member;

a shaft body disposed inside the pulley, the shaft body having a portion at which the shaft body is attached on a rotatable shaft with an attaching force; and a one-way clutch disposed between the pulley and the shaft body, the one-way clutch having a roller for performing a one-way clutch function, wherein the shaft body has a radial inside portion, the radial inside portion being located inside the roller and directly adjacent to the one-way clutch, and the radial inside portion being free from the attaching force applied on the shaft body.

14. The pulley unit according to claim 13, wherein the radial inside portion has no through hole on the axis thereof.

15. The pulley unit according to claim 13, further comprising:

a pair of bearings disposed between the pulley and the shaft body, the bearings being disposed on axial sides of the one-way clutch, respectively, wherein the shaft body has a pair of axially extending portions, the axially extending portions supporting the bearings respectively, and the axially extending portions extending from axial sides of the radial inside portion, respectively.

16. The pulley unit according to claim 15, wherein the axially extending portion has a screw adapted to be engaged with the rotatable shaft.

17. The pulley unit according to claim 13, further comprising:

means for fixing the shaft body on the rotatable shaft, the fixing means being screwed on the rotatable shaft while applying the attaching force on a portion of the shaft body other than the radial inside portion.

* * * * *